(12) United States Patent
Prakash et al.

(10) Patent No.: US 8,955,039 B2
(45) Date of Patent: Feb. 10, 2015

(54) MOBILE PLATFORM WITH SENSOR DATA SECURITY

(75) Inventors: Gyan Prakash, Beaverton, OR (US); Jesse Walker, Hillsboro, OR (US); Saurabh Dadu, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/611,862

(22) Filed: Sep. 12, 2012

(65) Prior Publication Data

US 2014/0075496 A1 Mar. 13, 2014

(51) Int. Cl.
*H04L 29/06* (2006.01)

(52) U.S. Cl.
USPC ............... 726/1; 726/2; 726/3; 726/4; 726/5; 726/17; 726/26; 726/27; 726/28; 726/29; 726/30; 713/168; 713/169; 713/170; 713/171; 713/172; 713/173; 713/174; 713/182; 713/183; 713/184; 713/185; 713/186

(58) Field of Classification Search
CPC .................................. H04L 9/00; H04L 9/32
USPC ............... 726/1–5, 17, 26–30; 713/168–174, 713/182–186
See application file for complete search history.

(56) References Cited

U.S. PATENT DOCUMENTS

| | | | |
|---|---|---|---|
| 8,219,811 B2 * | 7/2012 | Roundtree | 713/169 |
| 2005/0133582 A1 | 6/2005 | Bajikar | |
| 2006/0271548 A1 * | 11/2006 | Maes | 707/10 |
| 2009/0320143 A1 * | 12/2009 | Gear et al. | 726/29 |
| 2010/0125605 A1 | 5/2010 | Nair et al. | |
| 2010/0188328 A1 * | 7/2010 | Dodge et al. | 345/156 |
| 2010/0302028 A1 * | 12/2010 | Desai et al. | 340/539.3 |
| 2011/0065419 A1 * | 3/2011 | Book et al. | 455/411 |
| 2011/0167278 A1 * | 7/2011 | Goto et al. | 713/193 |
| 2012/0072979 A1 | 3/2012 | Cha et al. | |
| 2012/0222083 A1 | 8/2012 | Vaha-Sipila et al. | |
| 2012/0317555 A1 * | 12/2012 | Aluru et al. | 717/134 |
| 2013/0174211 A1 * | 7/2013 | Aad et al. | 726/1 |

FOREIGN PATENT DOCUMENTS

WO 2011/109772 A2 9/2011

OTHER PUBLICATIONS

International Search Report and Written Opinion received for PCT Patent Application No. PCT/US2013/058863, mailed on Dec. 30, 2013, 13 Pages.

\* cited by examiner

*Primary Examiner* — Josnel Jeudy
(74) *Attorney, Agent, or Firm* — Grossman, Tucker, Perreault & Pfleger, PLLC

(57) ABSTRACT

Generally, this disclosure describes devices, methods and systems for securely providing context sensor data to mobile platform applications. The method may include configuring sensors to provide context data, the context data associated with a mobile device; providing an application programming interface (API) to a sensor driver, the sensor driver configured to control the sensors; providing a trusted execution environment (TEE) operating on the mobile device, the TEE configured to host the sensor driver and restrict control and data access to the sensor driver and to the sensors; generating a request for the context data through the API, the request generated by an application associated with the mobile device; receiving, by the application, the requested context data and a validity indicator through the API; verifying, by the application, the requested context data based on the validity indicator; and adjusting a policy associated with the application based on the verified context data.

27 Claims, 5 Drawing Sheets

MOBILE PLATFORM WITH SENSOR DATA SECURITY

FIELD

The present disclosure relates to mobile platforms with sensor data security, and more particularly, to systems and methods for protection and verification of context aware sensor data on mobile platforms.

BACKGROUND

Mobile devices and platforms, such as, for example, smartphones, are increasingly used in electronic commerce (e-commerce) and other applications which may benefit from information about the environment surrounding the device. This information is sometimes referred to as context data. Context data, which may be collected by sensors associated with the device, is generally considered to be sensitive in nature and, with increased concerns about security and privacy, users of mobile devices may not want this context data to be made available to unauthorized entities.

Typically, an encryption based secure channel is established over a wireless network between the operating system or application running on the mobile device and remote entities such as servers. This method is vulnerable, however, to a type of attack known as a "man-in-the-middle" attack, where malicious software (mal-ware) may gain control of the device and obtain access to the context data before it is encrypted. The mal-ware may then redirect the context data to unauthorized entities (sometimes referred to as snooping) or may modify the context data prior to transmission to the authorized applications or intended destination (sometimes referred to as spoofing). In some cases, the modified (or counterfeit) data may be used to circumvent security restrictions.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Figure 1:
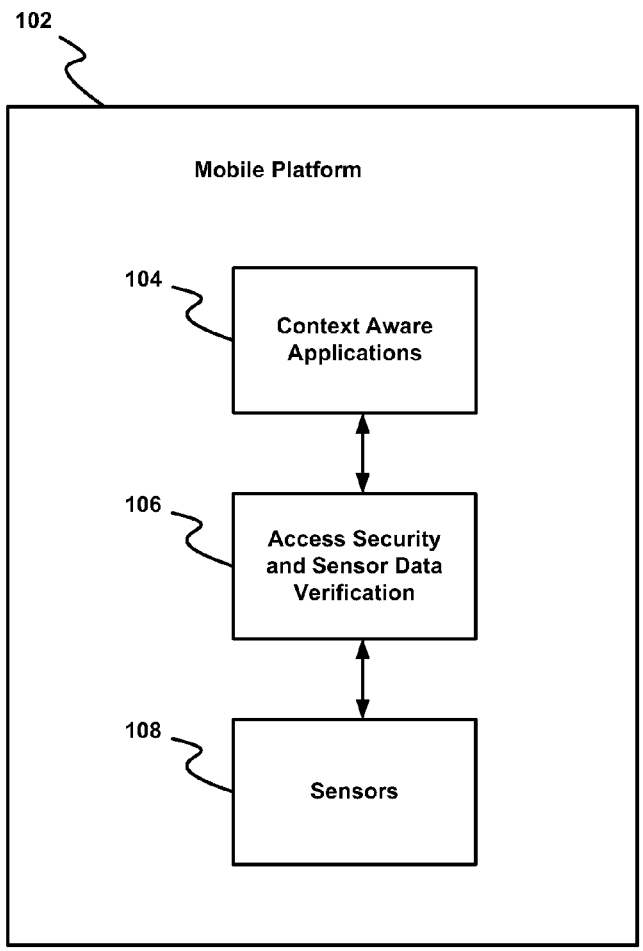
FIG. 1 illustrates a top level system diagram of one exemplary embodiment consistent with the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure provides devices, systems and methods for protection and verification of context aware sensor data on mobile platforms such as, for example, smartphones, tablets and laptops. The context data may be securely provided to context aware mobile applications, for example, e-commerce applications, that may adjust policy settings based on the context data. A trusted execution environment (TEE) may be provided to host secure drivers that access the sensors and the context data they generate. The TEE may restrict control access and data access to both the sensor drivers and the sensors from entities outside of the TEE, including the OS kernel, other modules and drivers executing at the OS level as well as higher level applications. The secure drivers may prevent unauthorized and/or unsecure applications from obtaining context sensor data. The secure drivers may also provide verification of the validity of the context data delivered to authorized and/or secure applications through the use of digital signatures or other encryption techniques. Context aware sensors may include global positioning system (GPS) or other sensors that provide location or motion information associated with the mobile platform. Other examples of context aware sensors may include cameras, microphones or any other type of suitable ambient sensor that may provide information about the environment surrounding the mobile platform.

The mobile platforms of the described embodiments may generally be capable of wireless communications over a wireless network and so the following definition of terms is provided.

The term access point (AP) as used herein, is defined as any entity that has station (STA) functionality and provides access to the distribution services, via the wireless medium (WM) for associated STAs.

The term Personal basic service set Control Point (PCP) as used herein, is defined as a STA that operates as a control point of the millimeter-wave (mm-wave) network.

The term wireless network controller as used herein, is defined as a station that operates as a PCP and/or as an AP of the wireless network.

The terms "traffic" and/or "traffic stream(s)" as used herein, are defined as a data flow and/or stream between wireless devices such as STAs. The term "session" as used herein is defined as state information kept or stored in a pair of stations that have an established a direct physical link (e.g., excludes forwarding); the state information may describe or define the session.

The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral device that is integrated with a computer, or a peripheral device that is attached to a computer. In some embodiments, the term "wireless device" may optionally include a wireless service.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, wireless local area network (WLAN) stations, wireless personal network (WPAN), and the like.

Some embodiments may be used in conjunction with various devices and systems, for example, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a smartphone, a digital television, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless AP, a wired or wireless router, a wired or wireless modem, a wired or wireless network, a wireless area network, a Wireless Video Are Network (WVAN), a Local Area Network (LAN), a WLAN, a PAN, a WPAN, devices and/or networks operating in accordance with existing Wireless HDTM and/or Wireless-Gigabit-Alliance (WGA) specifications and/or future versions and/or derivatives thereof, devices and/or networks operating in accordance with existing IEEE 802.11 (IEEE 802.11-2007: Wireless LAN Medium Access Control (MAC) and Physical Layer (PHY) Specifications) standards and amendments ("the IEEE 802.11 standards"), IEEE 802.16 standards for Worldwide Interoperability for Microwave Access (WiMAX), Third Generation Partnership Project (3GPP) including Long Term Evolution (LTE) and Long Term Evolution Advanced (LTE-A), and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, Wireless Metropolitan Area Networks (WMAN), Wireless Wide Area Networks (WWAN), ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

Some embodiments may be used in conjunction with suitable limited-range or short-range wireless communication networks, for example, "piconets", e.g., a wireless area network, a WVAN, a WPAN, and the like.

FIG. 1 illustrates a top level system diagram 100 of one exemplary embodiment consistent with the present disclosure. A mobile platform 102 is shown to comprise context aware applications 104 which may obtain data, including context data, from sensors 108 through access security module 106. Access security module 106 may be configured to restrict sensor access to authorized and/or secure applications. Access security module 106 may also provide sensor data verification and may be configured to operate in a trusted execution environment (TEE), as will be described in greater detail below. The mobile platform 102 may be any type of mobile or wireless communication device, such as, for example, a smartphone, a laptop or a tablet.

The context aware applications 104 may be secure or authorized mobile applications such as, for example, e-commerce applications, that may adjust policy settings based on the context data. For example, the location of the device may affect the method of payment or the level of security associated with a transaction. As another example, a determination that the device is in a moving vehicle may enable applications to impose restrictions on dialing or texting for safety considerations. Yet another example may include parental control and content rating management of media that is presented through applications on the device.

The sensors 108 may include context aware sensors such as GPS receivers, accelerometers, compasses, gyroscopes, cameras, microphones, touch sensors, temperature sensors, user authentication sensors or any other type of suitable ambient sensor that may provide information about the environment surrounding the mobile platform 102. Context data that may be provided by these types of sensors is generally considered to be sensitive or private in nature and therefore advantageously subject to protection against unauthorized distribution. It will further be appreciated that the validity of the data may also be verified to reduce the possibility that malicious software (mal-ware) may alter the context data being presented to the applications to circumvent security.

Figure 2:
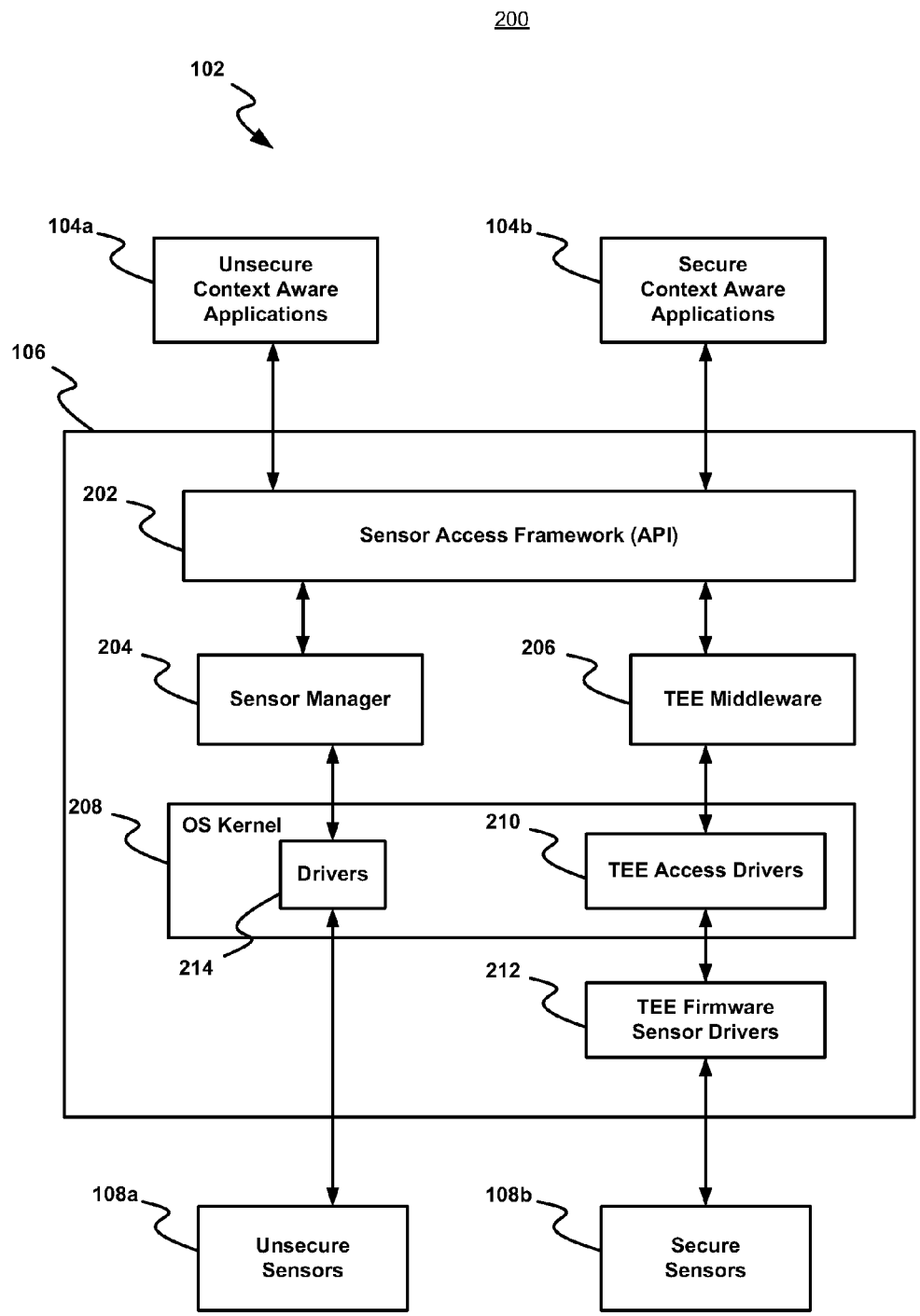
FIG. 2 illustrates a block diagram of one exemplary embodiment consistent with the present disclosure.

FIG. 2 illustrates a block diagram 200 of one exemplary embodiment consistent with the present disclosure. Mobile platform 102 is shown to comprise context aware applications in both unsecure 104a and secure 104b variations as well as sensors in both unsecure 108a and secure 108b variations, as will be described in greater detail below. Access security module 106 is shown in greater detail to include a sensor access framework application programming interface (API) 202, a sensor manager module 204, a TEE middleware module 206, OS kernel 208 and associated drivers 214, TEE access drivers 210, and TEE firmware sensor drivers 212.

The sensor access framework API 202 may be configured to provide a standardized interface through which the context aware applications, both secure 104b and unsecure (or legacy) applications 104a, may access the sensors 108. In some embodiments, the sensor access framework API 202 may be a Java based software development kit (SDK) or a Windows Runtime (Win®) or hypertext markup language 5 (HTML5) based API.

Secure transactions (e.g., requests and responses from applications 104b) may be processed through TEE middleware module 206 which provides an additional interface level between sensor access framework API 202 and the TEE access drivers 210. Unsecure transactions (e.g., requests and responses from applications 104a) may be processed through sensor manager module 204 which provides an alternative additional interface level between sensor access framework API 202 and the non-TEE drivers 214 that are integrated in the OS kernel 208. Sensor manager module 204 and TEE middleware module 206 may be provided as components that are external to the OS Kernel 208 to facilitate software updates to these components, to implement new features and/or bug fixes, without requiring a re-installation of the entire OS 208 which is generally more difficult and time consuming.

A trusted execution environment which may comprise, for example, firmware 212, may be provided for the sensor drivers for the secure context sensors 108b. The TEE firmware sensor drivers 212 may be accessed through TEE access drivers 210 which may be integrated in the OS kernel 208. The TEE firmware sensor drivers 212 may check the requests for sensor context data made by applications 104b to verify that the applications are authorized to receive such data and/or process it securely. The verification may be accomplished through the use of private/public key encryption, digital signatures, passwords, credentials or any other suitable security technique. Similarly, the TEE firmware sensor drivers 212 may provide validation of the sensor context data response made to the applications 104b through the use of private/public key encryption, digital signatures, passwords, credentials or any other suitable security technique.

For example, a trusted or secure context aware application 104b may make a request for sensor context data and present a credential indicating that the application is authorized to receive such data. The request and credential may be passed down through the sensor access framework API 202, the TEE middleware module 206, the TEE access drivers 210 and then to the TEE firmware sensor driver 212 where the credential will be verified. The TEE firmware sensor driver 212 will control the sensor hardware to obtain the desired data and may, for example, encrypt the data before providing it back up to the secure application 104b using a public/private key combination available to the secure application 104b.

The TEE firmware sensor drivers 212 may be configured to have direct access to the sensor hardware and sensor data, independent of drivers 214 in the OS kernel 208 which have the potential to be corrupted by mal-ware. Since the context data is secured or encrypted within the TEE firmware sensor drivers 212, non-trusted or malicious applications or OS services on the platform 102 may be prevented from accessing or modifying the information prior to or during transmission to the intended secure application 104b.

The TEE may be configured to provide security and isolation from other entities on the mobile platform 102 that are outside the TEE, such as, for example, the OS 208 and non-trusted applications 104a. The isolation may prevent external entities from exercising control over, or obtaining access to, the sensor drivers 212 or secure sensors 108b. In some embodiments, the TEE may comprise separate physical hardware, for example an integrated circuit (IC) that is separate from an IC associated with the platform 102. In some embodiments, the TEE may comprise a separate controller or processor within an IC that is shared with the platform 102. In some embodiments, the TEE may comprise a separate domain within a controller or processor that is shared with the platform 102. Various techniques may be employed to securely isolate the TEE including situations where hardware is being shared between the TEE and the platform 102. These techniques may include privileged execution modes associated with the processor, access protection mechanisms associated with memory and/or the use of firmware to prevent modification of the sensor drivers 212.

Legacy drivers 214 may also be integrated in the OS kernel 208 to provide access to the unsecure (or legacy) sensors 108a. To facilitate adoption and implementation of the security systems disclosed herein, some embodiments may implement a transition period during which legacy applications and drivers provide unsecure access to some or all of the context sensors in parallel with the disclosed secure access techniques. After the transition period has ended, the sensor manager 204 and/or legacy drivers 214 may be removed or disabled by an information technology (IT) administrator, a device user or other authorized entity, leaving only a secure access path to the context sensors.

Figure 3:
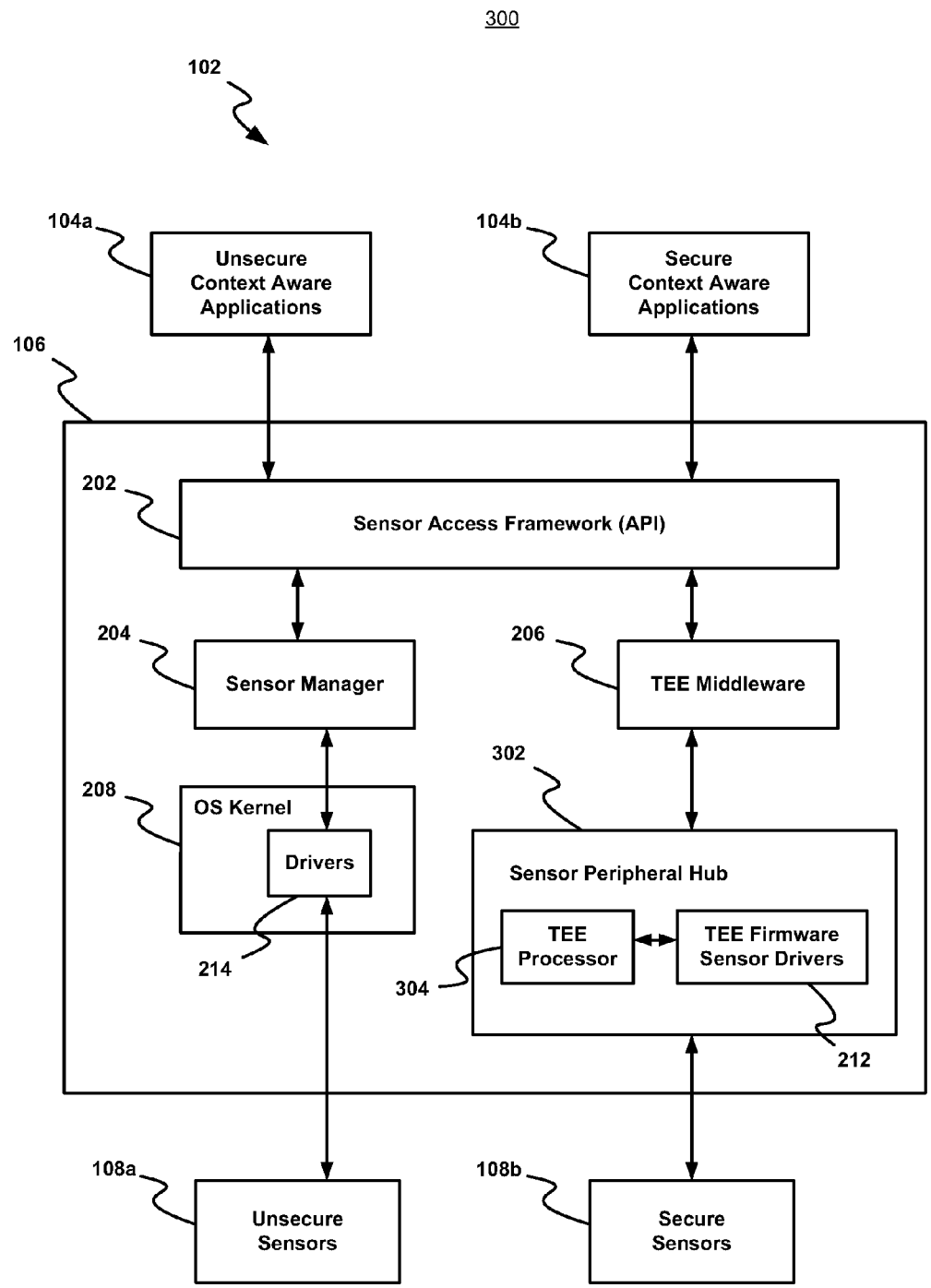
FIG. 3 illustrates a block diagram of another exemplary embodiment consistent with the present disclosure.

FIG. 3 illustrates a block diagram 300 of another exemplary embodiment consistent with the present disclosure. This embodiment is similar in most respects to the embodiment described above in connection with FIG. 2, with the exception that a sensor peripheral hub 302 is provided. The sensor peripheral hub 302 provides a central point through which most or all of the secure sensors 108b may be coupled to the trusted execution environment provided by TEE processor or microcontroller 304 and TEE firmware sensor drivers 212. The sensor peripheral hub 302, which is implemented as physical hardware that is separate from the other components of the platform 102 in this embodiment, provides additional isolation and security for the trusted execution environment.

Figure 4:
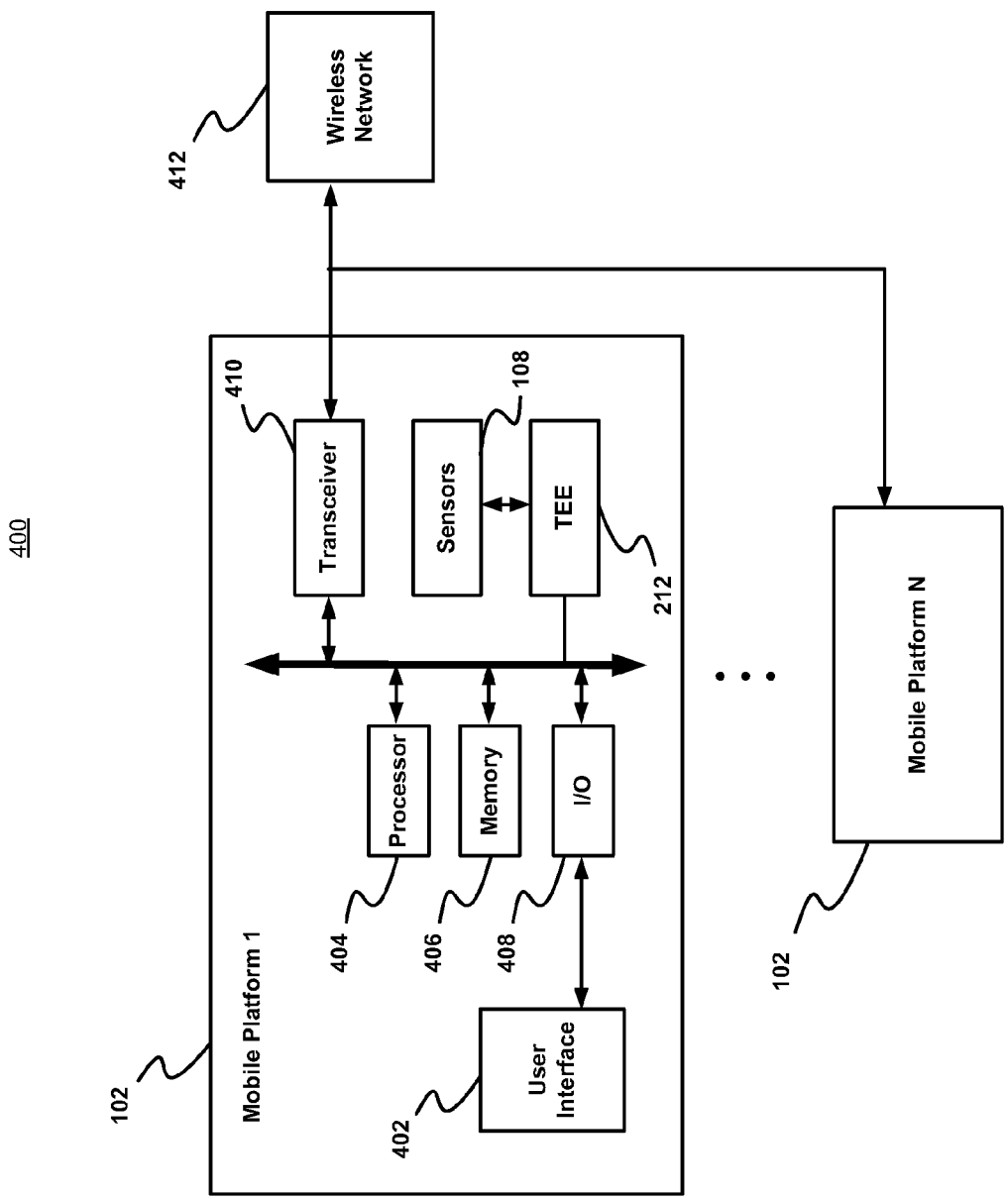
FIG. 4 illustrates a system diagram showing platforms consistent with an exemplary embodiment of the present disclosure in a network.

FIG. 4 illustrates a system diagram 400 showing platforms consistent with an exemplary embodiment of the present disclosure in a network. A platform 102 may be a mobile communication device, such as, for example, a smartphone, a tablet, a laptop computing device or any other device configured to transmit or receive wireless signals. The platform 102 may be configured with context aware sensors 108 and may provide secure access and verification capabilities through a trusted execution environment (TEE) 212. In some embodiments, platform 102 may comprise a processor 404, memory 406, an input/output (I/O) system 408, a display/keyboard or other type of user interface (UI) 402 such as, for example, a touchscreen. Any number of platforms 102 may transmit or receive signals through transceiver 410 over a network 412, which may be a wireless network.

In some embodiments, one or more virtual machines (VMs) may be provided on the platform 102. The VMs may share a common processor 404 and memory 406 but implement independent security policies with respect to sensor access.

Figure 5:
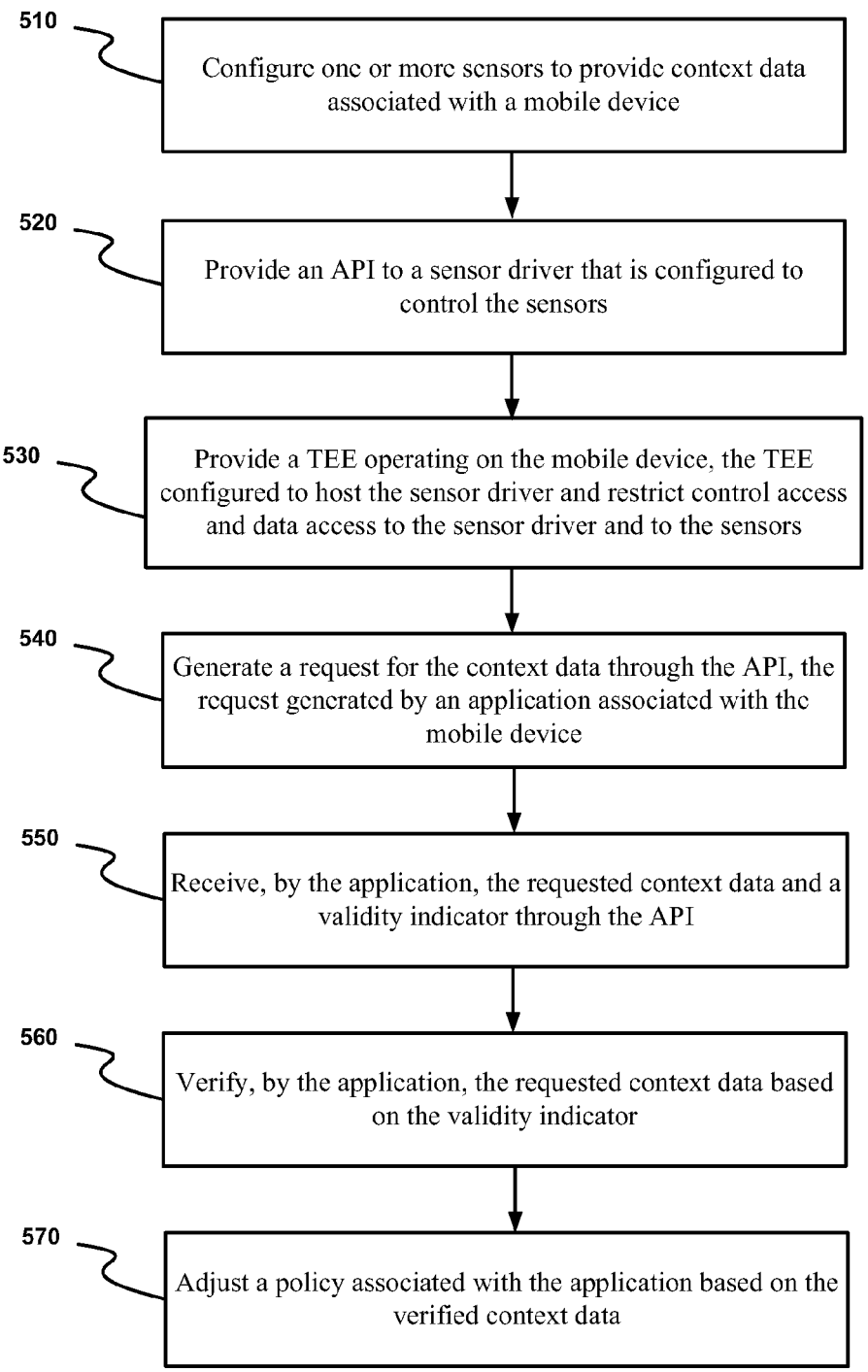
FIG. 5 illustrates a flowchart of operations of another exemplary embodiment consistent with the present disclosure.

FIG. 5 illustrates a flowchart of operations 500 of another exemplary embodiment consistent with the present disclosure. At operation 510, one or more sensors are configured to provide context data associated with a mobile device. At operation 520, an API to a sensor driver is provided. The API may be configured to control the sensors. At operation 530, a trusted execution environment (TEE) is provided to operate on the mobile device. The TEE may be configured to host the sensor driver and restrict control access and data access to the sensor driver and to the sensors. At operation 540, a request is generated for the context data through the API. The request is generated by an application associated with the mobile device. At operation 550, the application receives the requested context data and a validity indicator through the API. At operation 560, the application verifies the requested context data based on the validity indicator. At operation 570, a policy associated with the application is adjusted. The adjustment is based on the verified context data.

Embodiments of the methods described herein may be implemented in a system that includes one or more storage media having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides a device, method, system and computer readable storage media for securely providing context sensor data to mobile platform applications.

The method may include configuring one or more sensors to provide context data, the context data associated with a mobile device. The method of this example may also include providing an API to a sensor driver, the sensor driver configured to control the sensors. The method of this example may further include providing a TEE operating on the mobile device, the TEE configured to host the sensor driver and restrict control access and data access to the sensor driver and to the sensors. The method of this example may further include generating a request for the context data through the API, the request generated by an application associated with the mobile device. The method of this example may further include receiving, by the application, the requested context data and a validity indicator through the API. The method of this example may further include verifying, by the application, the requested context data based on the validity indicator. The method of this example may further include adjusting a policy associated with the application based on the verified context data.

Another example method includes the forgoing operations and the validity indicator includes a digital signature.

Another example method includes the forgoing operations and further includes encrypting, by the sensor driver, the requested context data.

Another example method includes the forgoing operations and the sensor is an accelerometer, a global positioning sensor, a compass, a camera, a proximity sensor, a microphone, a gyroscope, a touch sensor, an ambient temperature sensor or an ambient light sensor.

Another example method includes the forgoing operations and the context data is a device location, device position, device motion, user identification, temperature or noise level.

Another example method includes the forgoing operations and the policy is a mobile commerce payment policy, mobile commerce security policy or parental control of media viewing policy.

According to another aspect there is provided a device. The device may include one or more sensors configured to provide context data, the context data associated with the device. The device of this example may also include a secure sensor driver module configured to receive requests for the context data and, in response to the requests, provide the context data and an associated validity indicator. The device of this example may further include a TEE operating on the device, the TEE configured to host the secure sensor driver module and restrict control access and data access to the secure sensor driver module and to the sensors. The device of this example may further include one or more application modules configured to generate the requests, receive the context data, verify the context data based on the validity indicator, and adjust a policy associated with the application based on the verified context data.

Another example device includes the forgoing components and the validity indicator includes a digital signature.

Another example device includes the forgoing components and the secure sensor driver module is further configured to encrypt the context data.

Another example device includes the forgoing components and further includes a sensor peripheral hub coupled to each of the sensors, the sensor peripheral hub including a processor and memory to provide the TEE and firmware configured to store the secure sensor driver module.

Another example device includes the forgoing components and the sensor is an accelerometer, a global positioning sensor, a compass, a camera, a proximity sensor, a microphone, a gyroscope, a touch sensor, an ambient temperature sensor or an ambient light sensor.

Another example device includes the forgoing components and the context data is a device location, device position, device motion, user identification, temperature or noise level.

Another example device includes the forgoing components and the policy is a mobile commerce payment policy, mobile commerce security policy or parental control of media viewing policy.

According to another aspect there is provided at least one computer-readable storage medium having instructions stored thereon which when executed by a processor, cause the processor to perform the operations of the method as described in the examples above.

According to another aspect there is provided a mobile communication platform. The mobile communication platform may include a processor, a memory coupled to the processor, an I/O system coupled to the processor and a user interface coupled to the I/O system. The mobile communication platform of this example may also include one or more sensors coupled to the processor, the sensors configured to provide context data associated with the platform. The mobile communication platform of this example may further include a secure sensor driver module configured to receive requests for the context data and, in response to the requests, provide the context data and an associated digital signature. The mobile communication platform of this example may further include a TEE operating on the platform, the TEE configured to host the secure sensor driver module and restrict control access and data access to the secure sensor driver module and to the sensors. The mobile communication platform of this example may further include one or more application modules configured to generate the requests, receive the context data, verify the context data based on the digital signature, and adjust a policy associated with the application based on the verified context data.

Another example mobile communication platform includes the forgoing components and the sensor is an accelerometer, a global positioning sensor, a compass, a camera, a proximity sensor, a microphone, a gyroscope, a touch sensor, an ambient temperature sensor or an ambient light sensor.

Another example mobile communication platform includes the forgoing components and the context data is a platform location, platform position, platform motion, user identification, temperature or noise level.

Another example mobile communication platform includes the forgoing components and the policy is a mobile commerce payment policy, mobile commerce security policy or parental control of media viewing policy.

Another example mobile communication platform includes the forgoing components and the platform is a smartphone, a laptop computing device or a tablet.

Another example mobile communication platform includes the forgoing components and further includes a plurality of the platforms, each configured to communicate over a wireless network.

Another example mobile communication platform includes the forgoing components and the user interface is a touchscreen and/or keyboard.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method for securely providing context sensor data, said method comprising:
    configuring one or more sensors to provide context data, said context data associated with a mobile device;
    providing an application programming interface (API) to a sensor driver, said sensor driver configured to control said sensors;
    providing a trusted execution environment (TEE) operating on said mobile device, said TEE configured to host said sensor driver and restrict control access and data access to said sensor driver and to said sensors;
    generating a request for said context data through said API, said request generated by an application associated with said mobile device;
    receiving, by said application, said requested context data and a validity indicator through said API, wherein said validity indicator is generated by said TEE;
    verifying, by said application, that said requested context data is received from said TEE based on said validity indicator; and
    adjusting a policy associated with said application based on said verified context data.

2. The method of claim 1, wherein said validity indicator comprises a digital signature.

3. The method of claim 1, further comprising encrypting, by said sensor driver, said requested context data.

4. The method of claim 1, wherein said sensor is selected from the group consisting of an accelerometer, a global positioning sensor, a compass, a camera, a proximity sensor, a microphone, a gyroscope, a touch sensor, an ambient temperature sensor and an ambient light sensor.

5. The method of claim 1, wherein said context data is selected from the group consisting of device location, device position, device motion, user identification, temperature and noise level.

6. The method of claim 1, wherein said policy is selected from the group consisting of mobile commerce payment policy, mobile commerce security policy and parental control of media viewing policy.

7. A device for mobile communication, said device comprising:
    a memory coupled to a processor;
    one or more sensors configured to provide context data, said context data associated with said device;
    a secure sensor driver module configured to receive requests for said context data and, in response to said requests, provide said context data and an associated validity indicator;
    a trusted execution environment (TEE) operating on said device, said TEE configured to host said secure sensor driver module, generate said validity indicator, and restrict control access and data access to said secure sensor driver module and to said sensors; and
    one or more application modules configured to generate said requests, receive said context data, verify that said context data is received from said TEE based on said validity indicator, and adjust a policy associated with said application based on said verified context data.

8. The device of claim 7, wherein said validity indicator comprises a digital signature.

9. The device of claim 7, wherein said secure sensor driver module is further configured to encrypt said context data.

10. The device of claim 7, further comprising a sensor peripheral hub coupled to each of said sensors, said sensor peripheral hub comprising a processor and memory to provide said TEE and firmware configured to store said secure sensor driver module.

11. The device of claim 7, wherein said sensor is selected from the group consisting of an accelerometer, a global positioning sensor, a compass, a camera, a proximity sensor, a microphone, a gyroscope, a touch sensor, an ambient temperature sensor and an ambient light sensor.

12. The device of claim 7, wherein said context data is selected from the group consisting of device location, device position, device motion, user identification, temperature and noise level.

13. The device of claim 7, wherein said policy is selected from the group consisting of mobile commerce payment policy, mobile commerce security policy and parental control of media viewing policy.

14. A non-transitory computer-readable storage medium having instructions stored thereon which when executed by a processor result in the following operations for securely providing context sensor data, said operations comprising:
    configuring one or more sensors to provide context data, said context data associated with a mobile device;
    providing an application programming interface (API) to a sensor driver, said sensor driver configured to control said sensors;
    providing a trusted execution environment (TEE) operating on said mobile device, said TEE configured to host said sensor driver and restrict control access and data access to said sensor driver and to said sensors;

generating a request for said context data through said API, said request generated by an application associated with said mobile device;

receiving, by said application, said requested context data and a validity indicator through said API, wherein said validity indicator is generated by said TEE;

verifying, by said application, that said requested context data is received from said TEE based on said validity indicator; and adjusting a policy associated with said application based on said verified context data.

15. The computer-readable storage medium of claim 14, wherein said validity indicator comprises a digital signature.

16. The computer-readable storage medium of claim 14, further comprising the operations of encrypting, by said sensor driver, said requested context data.

17. The computer-readable storage medium of claim 14, wherein said sensor is selected from the group consisting of an accelerometer, a global positioning sensor, a compass, a camera, a proximity sensor, a microphone, a gyroscope, a touch sensor, an ambient temperature sensor and an ambient light sensor.

18. The computer-readable storage medium of claim 14, wherein said context data is selected from the group consisting of device location, device position, device motion, user identification, temperature and noise level.

19. The computer-readable storage medium of claim 14, wherein said policy is selected from the group consisting of mobile commerce payment policy, mobile commerce security policy and parental control of media viewing policy.

20. A mobile communication platform comprising:
a processor;
a memory coupled to said processor;
an input/output (I/O) system coupled to said processor;
a user interface coupled to said I/O system;
one or more sensors coupled to said processor, said sensors configured to provide context data associated with said platform;
a secure sensor driver module configured to receive requests for said context data and, in response to said requests, provide said context data and an associated digital signature;
a trusted execution environment (TEE) operating on said platform, said TEE configured to host said secure sensor driver module and restrict control access and data access to said secure sensor driver module and to said sensors; and
one or more application modules configured to generate said requests, receive said context data, verify that said context data is received from said TEE based on said digital signature, and adjust a policy associated with said application based on said verified context data.

21. The mobile communication platform of claim 20, wherein said sensor is selected from the group consisting of an accelerometer, a global positioning sensor, a compass, a camera, a proximity sensor, a microphone, a gyroscope, a touch sensor, an ambient temperature sensor and an ambient light sensor.

22. The mobile communication platform of claim 20, wherein said context data is selected from the group consisting of platform location, platform position, platform motion, user identification, temperature and noise level.

23. The mobile communication platform of claim 20, wherein said policy is selected from the group consisting of mobile commerce payment policy, mobile commerce security policy and parental control of media viewing policy.

24. The mobile communication platform of claim 20, wherein said platform is selected from the group consisting of a smartphone, a laptop computing device and a tablet.

25. The mobile communication platform of claim 20, further comprising a plurality of said platforms, each configured to communicate over a wireless network.

26. The mobile communication platform of claim 20, wherein said user interface is a touchscreen.

27. The mobile communication platform of claim 20, wherein said user interface is a keyboard.

* * * * *